United States Patent [19]

Shaw

[11] 4,097,647

[45] Jun. 27, 1978

[54] LITHOGRAPHIC PRINTING PLATE

[75] Inventor: Michael J. Shaw, Kalamazoo, Mich.

[73] Assignee: Allied Paper Incorporated, Kalamazoo, Mich.

[21] Appl. No.: 634,900

[22] Filed: Nov. 24, 1975

[51] Int. Cl.[2] .......................... B41C 1/10; B41N 1/08; B32B 13/08

[52] U.S. Cl. .................................... 428/325; 101/460; 101/462; 427/372 A; 427/391; 428/328; 428/341; 428/342; 428/446; 428/452; 428/454; 428/537

[58] Field of Search ............... 428/446, 454, 325, 328, 428/331, 537, 452, 340–342; 101/460, 462; 427/372 A, 391

[56] References Cited

U.S. PATENT DOCUMENTS

| | | | |
|---|---|---|---|
| 3,181,460 | 5/1965 | Perkins | 101/462 |
| 3,230,873 | 1/1966 | Ont | 101/462 |
| 3,254,597 | 6/1966 | Perkins | 101/462 |
| 3,338,164 | 8/1967 | Webers | 101/462 |
| 3,357,352 | 12/1967 | Williams, Jr. | 101/462 |
| 3,733,200 | 5/1973 | Takaishi | 101/462 |
| 3,736,872 | 6/1973 | Martens | 101/462 |
| 3,846,354 | 11/1974 | Fallwell | 428/454 |

FOREIGN PATENT DOCUMENTS

| | | | |
|---|---|---|---|
| 2,107,901 | 9/1971 | Germany | 101/460 |

*Primary Examiner*—Ellis Robinson
*Attorney, Agent, or Firm*—Richard H. Thomas

[57] ABSTRACT

An improved lithographic printing plate having a lithographic surface thereon comprising a resinous coating, at least a major fraction of which is a self-insolubilizing or cross-linkable cationic resinous binder.

13 Claims, No Drawings

LITHOGRAPHIC PRINTING PLATE

This invention relates to a lithographic printing plate having a lithographic printing surface thereon comprising a resinous coating. Such printing plates are discussed in U.S. patent application Ser. No. 493,528, filed Aug. 1, 1974, and entitled "Lithographic Printing Plate and Process for Making Same" now U.S. Pat. No. 3,922,441. The teachings of that patent application are incorporated herein by reference.

BACKGROUND OF THE INVENTION

Paper base lithographic printing plates and methods for making the same have been well known for a considerable period of time. Lithography depends upon the immiscibility of a greasy lithographic printing ink and an aqueous etch or lithographic solution. In use, a paper lithographic printing plate is firt imaged in a known manner with typed, written, or drawn copy material to be reproduced. The image may also be obtained in other ways, for instance, by xerography; e.g., Electrofax (trademark, Radio Corp. of America) and Xerox (trademark, Xerox Corp.). The grease-receptive imaging material employed makes the imaged areas ink receptive and water repellent (i.e. hydrophobic). The remaining non-imaged surface is water receptive and ink repellent (i.e. hydrophilic).

The imaged plate is placed on a plate cylinder of an offset duplicating press. The overall surface of the plate then is treated with an aqueous wet-out liquid which wets all portions of the plate except those areas that have been imaged and are water repellent. The press inking roll then passes over the surface of the plate and deposits a film of ink only upon the ink-receptive imaged areas. In the printing operation, the ink from the imaged areas is transferred in reverse to a rubber offset blanket which in turn prints directly onto a paper sheet so as to form a copy.

The prior art is replete with examples of coating surfaces employed in the preparation of lithographic printing plates. Prior patent application Ser. No. 493,528 describes a lithographic printing plate having a lithographic surface comprising a coating of a positively charged colloidal silica and an insolubilized hydrophilic polymer. Such printing surface conventionally requires the application of a barrier coat onto the paper base prior to the application of the silica containing coating, which is commonly called a face coat. The barrier coat contains a pigment and resin binder to provide both surface smoothness and water resistance to the paper base sheet. The barrier coat may be dispensed with for a short-run plate, but for medium-to-long run plates, e.g., 1,000–5,000 copies, fairly heavy barrier coats advantageously are employed.

Applicant is aware of no prior art in which the lithographic surface comprises a resinous coating, at least a major fraction of which is a self-insolubilizing of cross-linkable cationic resinous binder. Such self-insolubilizing or cross-linkable cationic resins are known in the paper art, but as additives to the paper stock, as binders for the cellulosic fiber, and other such uses.

Desirable attributes of a lithographic or planographic printing plate include the producing of clean copy, good toning, good imaging, stop-go properties, and lack of curling or wrinkling of plates while on a press. It is also desirable that the plate, while accepting ink and etch, be sufficiently water resistant so that it will not "milk" or "pick". The instant face coating for direct image masters, because of its simplicity, can be applied at high speeds to paper or other conventional lithographic bases such as metal or plastic to provide plates having the foregoing attributes.

SUMMARY OF THE INVENTION

The improved printing plate of the present invention having a lithographic printing surface thereon comprising a resinous coating is one which includes at least a major fraction of said coating a self-insolubilizing or cross-linkable cationic resinous binder. The binder can be applied as an aqueous dispersion or a solution in water or fugitive organic solvent such as hydrocarbon, ether, ketone, or ester effectively vaporizing away at 100° C. The cationic binder can be cross-linked on drying either with itself or with an added cross-linker such as a melamine-formaldehyde resin in the dispersion.

For the preparation of a lithographic printing surface, the resinous coating also includes pigment, preferably present in the proportion of about 50–90 parts pigment with about 10–50 parts resin.

DETAILED DESCRIPTION OF THE INVENTION

Suitable cross-linkable, self-crosslinking, or self-insolubilizing resins for the purpose of the present invention include epoxy type materials such as resinous epichlorohydrin quaternized with an amine; and acrylic nonionic or neutral type resins such as diacetone acrylamide [N-(1,1-dimethyl-3-oxobutyl)acrylamide], hydroxymethyldiacetone acrylamide or acrylamide, having a cationic co-monomer, such as methylol acrylamide. Many of these materials are currently manufactured by Lubrizol Corporation and Hercules Incorporated. The inclusion of acrylamide units, such as methylol acrylamide in such resinous material, as copolymerized components, assists in self-cross-linking and insolubilizing. Alternatively, the acrylics can be insolubilized by cross-linking with an aminoplast such as melamine-formaldehyde resins including substituted resins (e.g., hexamethylol melamine-formaldehyde resin), benzoguanamine resin or the like.

Other suitable resins for the present purpose include a water soluble cationic resin, such as a cationic polyacrylamide, a cationic polyamide epichlorohydrin resin, and a cationic urea formaldehyde resin. Examples of such cationic polymers are the cationic polyacrylamides "Reten 304" and "Reten 763" (trademarks, Hercules Incorporated); the cationic polyamide epichlorohydrin resins "Kymene 557", "Kymene 557 H" and "Kymene 709" (trademarks, Hercules Incorporated); and the cationic urea formaldehyde resins "Kymene 917" and "Kymene 917S" (trademarks, Hercules Incorporated). Such cationic binders can also be copolymerized with co-monomers (e.g., methylol acrylamide), or cross-linked with an aminoplast such as a melamine-formaldehyde resin, a benzoguanamine resin or the like. In such cross-linking, the cross-linking agent may be employed in the ratio of about 0.1 to about 10 parts cross-linking agent per part of cationic resin, following conventional technology. Other methods of insolubilization such as cross-linking with an aldehyde may be used.

It is understood that other conventional monomers may be employed in combination with the above to impart desirable properties to the lithographic surface, such as methylmethacrylate, styrene, and maleic anhydride.

The resinous coating can also contain cationic colloidal silica and/or polyvinyl alcohol, for improved performance, in accordance with the concepts of prior application Ser. No. 493,528.

The resinous coating of the present invention may also be extended with pigments that are non-flocculating in a cationic binder system. Thus, neutral clay, acid clay, silica, talc or certain specially treated clays are in order. Anionic clays can be used where they are protected by a stable coating such as a protective colloid, e.g., gum arabic or gelatin or otherwise sheathed to have a cationic or nonionic sheath. One suitable pigment for use in this regard is titanium dioxide pigment Zopaque RCL-9 (trademark, Glidden-Durkee Division of SCM Corporation) having a particle size size (mean particle diameter as determined by electron microscope) of about 0.25 microns.

Such pigmentary materials preferably are used in a proportion up to about 100 parts by weight per part of the resinous coating. The pigmentary materials are discussed in application Ser. No. 634,899, filed of even date herewith, and entitled "Improved Lithographic Printing Plate" (Assignee's docket AP 37-B), incorporated by reference herein now U.S. Pat. No. 4,046,946.

Solids such as pigmentary materials are kept in suspension with agitation. The pigmentary substances generally are quite fine, advantageously having an average particle size not substantially above about 0.44 microns and generally about 0.25 microns or less.

Various other additives can be added in small proportions, e,g,, water repellents such as fluoroacrylate polymers, salts of low volatility at 100° C., zirconium acetate, zinc chloride, zinc acetate, and various aluminum silicates (in proportions of, by way of example, 0.1 to 10% of the resinous coating.

Minor proportions of cobinders that are compatible also can be used. These include polyvinyl alcohol, preferably at least about 88% hydrolyzed, water soluble modified starch, corn hull gum, guar gum, dextran, dextrin, carboxymethyl cellulose, hydroxyethyl cellulose, polyacrylamide.

The resinous binder ordinarily is applied to the base such as paper at a rate of 1 to 10 pounds per ream (3,300 square feet), advantageously 2 to 5 pounds per ream, and preferably about 3 pounds per ream. Prior to cross-linking, the cationic resinous binder and other additives advantageously are dispersed in water for efficiency and economy.

Ordinarily, a barrier coat can be dispensed with in the printing plate of the present invention, but, if desired, the conventional barrier coats such as those shown in Ser. No. 493,528 can be applied, e.g., for efficiency and economy by size press coating.

Viscosity of any coating used here advantageously is maintained not to exceed about 5000 centipoises at 30° C. and preferably is lower, being not more than about 1000 centipoises, for speed and ease of application. This lithographic coating or face coat, as it is sometimes called, can be applied by using a rod coater, a roll coater, an air knife coater, or by size press coating. The proportions of materials in the coating comprising a lithographic printing surface and the weight of coating to be applied in accordance with the present invention are given in terms of dried resinous binder exclusive of any water or fugitive solvent which, of course, is volatilized away during the heating and drying of the coating for making the binder cross-link.

EXAMPLE

An internally sized, wet strength, paper base sheet of plain kraft paper, having no barrier coat, has applied to it a coating formulation in accordance with the concepts of the present invention at the rate of about 3 pounds per ream (3,300 square feet). The coating formulation is as follows:

| | |
|---|---|
| Kymene 557 (cationic polyamide epichlorohydrin resin, trademark, Hercules Incorporated) plus melamine-formaldehyde resin, in the ratio of about 1 part melamine-formaldehyde resin to 10 parts Kymene 557 | 20% |
| $TiO_2$ pigment (Zopaque RCL-9) | 80% |
| Total | 100% |

the proportions being based on the dry weight of the coating components absent fugitive solvents and volatiles.

The coating formulation is applied to the base paper sheet employing any conventional coater. Preferably, it is applied on a size press, following smoothing of the paper base sheet to less than about 150 Sheffield units, following the procedure of co-pending application Ser. No. 653,469, on "Improvement in Process for Producing Lithographic Printing Plates Having a Paper Base" (Assignee's docket AP 37-D) now abandoned. The disclosure of said co-pending application is incorporated by reference herein.

In the above Example, a cobinder such as polyvinyl alcohol, at least 88% hydrolyzed, can be included in the formulation in the amount of up to about 20% on a dry weight basis. Other additives, mentioned above, can be included.

I claim:

1. A lithographic printing plate having a lithographic printing surface thereon capable of receiving an ink receptive image comprising a coating in the amount of about 1 to 10 pounds per ream consisting essentially of a fine particle size pigment and a hydrophilic cross-linked cationic resinous binder.

2. The plate of claim 1 wherein said binder and pigment are present in the proportions of about 50–90 parts by weight pigment and about 10–50 parts by weight binder and said binder is the product of self-crosslinking.

3. The plate of claim 1 wherein said binder and pigment are present in the proportions of about 50–90 parts by weight pigment and about 10–50 parts by weight binder and said binder is the product of cross-linking with about 0.1 to about 10 parts by weight extraneous cross-linker per part of binder.

4. The plate of claim 1 wherein non-flocculating pigment is dispersed in said lithographic printing surface.

5. The plate of claim 1 wherein the base of said printing plate is paper.

6. A method of making a lithographic printing plate having a lithographic printing surface thereon capable of receiving an ink receptive image comprising preparing an aqueous coating composition consisting essentially of a water-soluble hydrophilic cross-linkable cationic resinous binder and a fine particle size pigment, applying said composition to a paper base in the amount of about 1 to 10 pounds per ream, and drying the composition on said base.

7. The method of claim 6 wherein the coating composition has a viscosity not substantially in excess of about 5,000 centipoises at 30° C.

8. The method of claim 7 wherein said coating composition contains about 50–90 parts by weight pigment and about 10–50 parts by weight binder.

9. The method of claim 8 wherein said binder is self-crosslinkable.

10. The method of claim 8 wherein said coating composition contains about 0.1 to about 10 parts by weight extraneous cross-linker per part of binder, said cross-linker being cross-linkable with the binder.

11. A lithographic printing plate having a lithographic printing surface thereon capable of receiving an ink receptive image comprising a paper base;

a coating on said paper base in the amount of about 1 to 10 pounds per ream consisting essentially of a non-flocculating fine particle size pigment and a hydrophilic cross-linked cationic resinous binder, said pigment and binder being present in the proportions of about 50–90 parts by weight pigment and about 10–50 parts by weight binder; and said binder being the product of self-crosslinking or cross-linking with about 0.1 to about 10 parts by weight extraneous cross-linker per part of binder.

12. A method of making a lithographic printing plate having a lithographic printing surface thereon capable of receiving an ink receptive image comprising the steps of preparing an aqueous coating composition consisting essentially of about 10–50 parts by weight of a water-soluble hydrophilic cross-linkable cationic binder and about 50–90 parts by weight of a non-flocculating fine particle size pigment;

said composition having a viscosity not substantially in excess of about 5,000 centipoises at 30° C;

applying said composition to a paper base at the rate of about 1 to about 10 pounds per ream; and drying the composition on said base.

13. The method of claim 12 wherein said composition also contains about 0.1 to about 10 parts by weight extraneous cross-linker per part of binder.

* * * * *